April 17, 1962 C. G. ROPER 3,029,657

BELT RECORD DRIVE MECHANISM

Filed May 9, 1960

INVENTOR.
CHARLES G. ROPER
BY
Curtis, Morris + Safford
ATTORNEYS 3,029,657

BELT RECORD DRIVE MECHANISM

Charles G. Roper, Fairfield, Conn., assignor to Dictaphone Corporation, Bridgeport, Conn., a corporation of Connecticut Filed May 9, 1960, Ser. No. 27,819
4 Claims. (Cl. 74—241)

This invention relates to an improved mandrel and flange arrangement for supporting and driving a belt-record in a dictating machine and the like.

An object of the invention is to provide a dual-mandrel mechanism for supporting and driving a belt-record in a dictating machine and the like so that the record can be played a great many times without fraying or wearing its edge.

Another object is to provide such a mechanism which is simple, reliable and inexpensive.

These and other objects will in part be understood from and in part pointed out in the description given hereinafter.

In a dictating machine, such as described in U.S. application Serial No. 728,646, there is a pair of small diameter mandrels spaced generally parallel to each other for supporting and driving a short, wide belt record past a recording head and a playback head. To insure that the record is accurately positioned with respect to these heads, the inner side edge of the record is indexed against a radial flange on one end of one of the mandrels, the mandrels being arranged slightly non-parallel to each other so that this edge of the record continuously rides against the flange when the mandrels are rotated. Now, it has been found that in a record-driving arrangement of this kind, the adjustment of the mandrels to keep the record properly indexed against the flange has to be carefully made. If the adjustment is improper or if it changes during use, the record edge may not make contact with the flange thus possibly distorting or destroying a portion of the sound track on the record. Conversely, if the record edge bears against the flange with too much force, the edge quickly wears or frays, moreover, there is an unpleasant scraping noise. Even when the mandrels are properly adjusted, where the same record will be played or re-recorded a great number of times, this edge wear becomes severe and gives rise to improper indexing of the record on the mandrels. The present invention effectively eliminates these difficulties.

In accordance with the present invention wearing of the edge of a belt-record in a dual-mandrel arrangement as described above is effectively eliminated by causing the index flange on one of the mandrels to make contact with the record only where record and flange do not move relative to each other. Thus, there can be no wear of the record edge regardless of how often the record is played, but yet the indexing function of the flange is retained. It has been found that by virtue of this arrangement belt-record life is increased ten to thirty times.

In one specific embodiment of the invention the end portion of the mandrel carrying the index flange is formed as a separate short-length sleeve. It is coaxially mounted by means of a pivoting bearing at its outer end on the axle supporting the main portion of the mandrel, and is free to wobble at its inner end as the mandrel rotates. This sleeve is a conical section rather than a true cylinder and its larger end abuts the end of the main portion of the mandrel, which is cylindrical. Now the diameter of this larger abutting end of the sleeve is made slightly larger than the diameter of the cylindrical portion of the mandrel so that a belt record stretched between this mandrel and the other will cause the sleeve to wobble on its bearing as the mandrels rotate. The outer end of the sleeve comprises a circular flange or raised shoulder against which the inner edge of a belt record can be indexed. However, since the sleeve is canted on its bearing relative to the remainder of the mandrel whenever a record is mounted upon it, the flange will make contact with the record edge only in one place and not where there is relative movement of record and flange. Advantages of this construction are that it is compact and rugged.

A better understanding of the invention together with a fuller appreciation of its many advantages will best be gained from the following description given in connection with the accompanying drawings wherein.

Figures 1, 2:
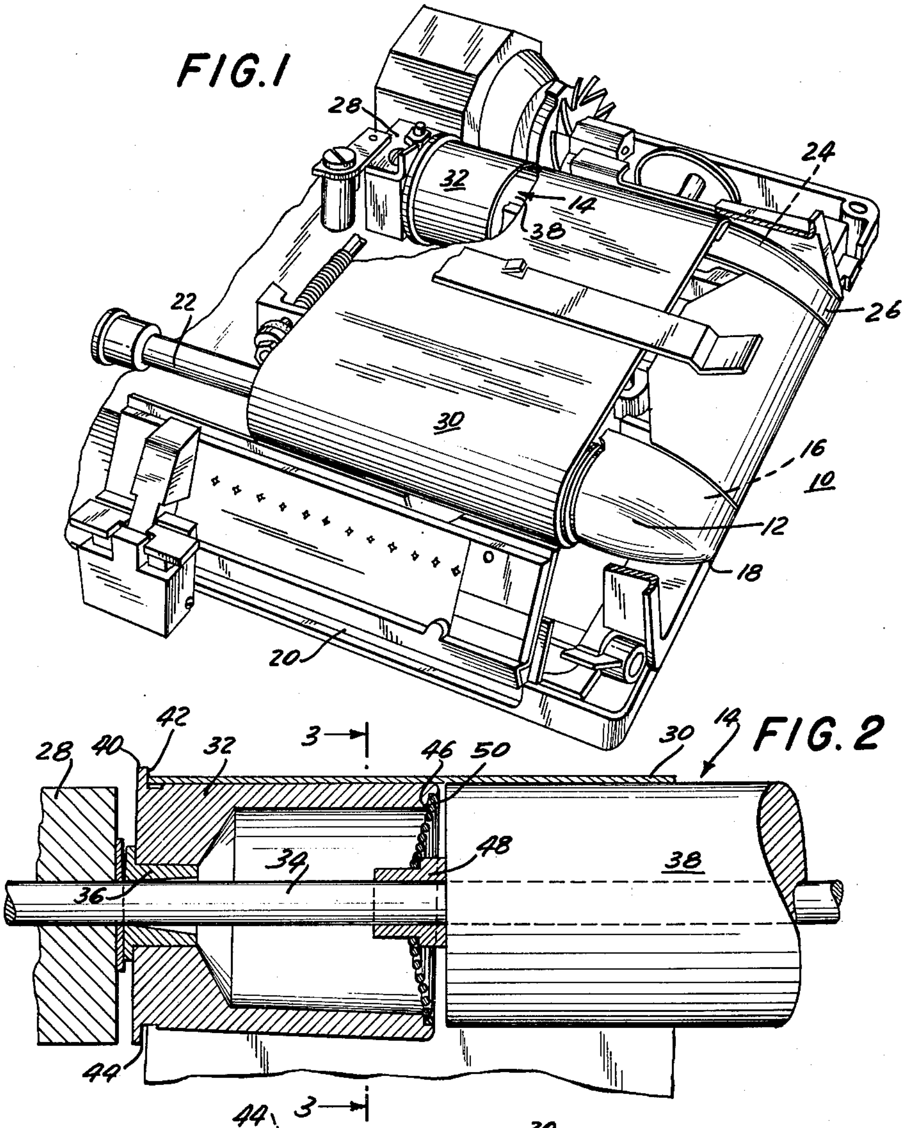
FIGURE 1 is a perspective view of a dual mandrel belt-record driving mechanism embodying the invention.
FIGURE 2 is an enlarged plan view partly in section of a portion of FIGURE 1 showing the wobble sleeve portion of the index mandrel.

The belt-record mechanism 10 seen in FIGURE 1 comprises a forward drive mandrel 12 and a rear idler mandrel 14 spaced generally parallel to it. The right end of forward mandrel 12 is rotatably journalled in a bearing 16 (not fully shown) recessed within a stationary guide shoe 18 mounted on a frame or base 20. Mandrel 12 is adapted to be rotated at constant speed by a shaft 22 extending to a drive connection (not shown) but which can be identical to that shown in application Serial No. 728,646. Rear mandrel 14, similarly, at its right end is journalled in a laterally shiftable bearing 24 (not fully shown) inside another guide shoe 26. The left end of this rear mandrel is carried in a similar shiftable bearing 28, this end bearing 28 being movable in unison with end bearing 24 to shift mandrel 14 closer to or farther from front mandrel 12 and thereby permit the insertion upon or removal from the mandrels of a belt record 30. A detailed description of this operation and of the elements associated with mandrels 12 and 14 not described herein and not forming part of the present invention will be found in the aforesaid application Serial No. 728,646.

As seen in FIGURE 2 the left end portion of mandrel 14 comprises a sleeve 32 which is coaxially mounted on an axle 34 by means of a pivotable bearing 36. Axle 34 on its left is journalled in bearing 28 and to the right is rigidly fixed within the center of the cylindrical portion 38 of mandrel 14. Sleeve 32 is a short-length section of a cone and its left edge comprises a rigid circular shoulder 40. The diameter of the sleeve adjacent this shoulder is effectively the same as the diameter of mandrel portion 38; whereas the diameter of the sleeve abutting the end of portion 38 is somewhat larger in diameter. Thus this end of the sleeve is displaced relative to the axle by the belt record so that the outer surface zone of the sleeve where the record curves around it is in line with cylindrical portion 38. As the belt and mandrels rotate, sleeve 32 will wobble thereby canting shoulder 40 into contact with the record edge at point 42 and out of contact at other points, as illustrated at 44.

Figure 3:
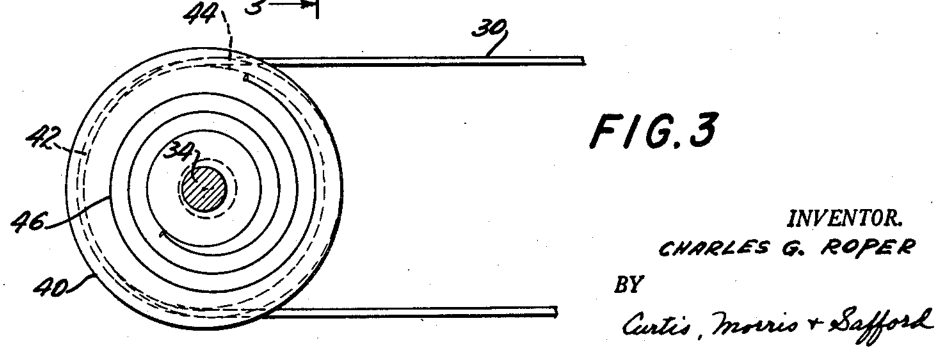
FIGURE 3 is a view taken as indicated by lines 3—3 in FIGURE 2.

The end of sleeve 32 next to portion 38 is resiliently supported by a spiral spring 46 (see also FIGURE 3) engaged between a cylindrical hub 48 on axle 34 and a circular shoulder 50 on the inner end face of the sleeve. This spring centers this end of the sleeve when no record is mounted on the mandrels.

The above description is intended in illustration and not in limitation of the invention. Various minor changes may occur to those skilled in the art and may be made without departing from the spirit or scope of the invention as set forth.

I claim:

1. In belt-record supporting and drive mechanism, a pair of generally parallel mandrels adapted to support a belt record stretched between them, one of said mandrels having a cylindrical portion mounted on an axle, a short-length sleeve resiliently mounted on said axle coaxial with said cylindrical portion at the inner end thereof, said sleeve being a generally conical section and having a diameter slightly greater than that of said cylindrical portion adjacent the end thereof, the other or outer end of said sleeve having a circular index flange or shoulder against which the inner edge of the record abuts.

2. The structure in claim 1 wherein said sleeve at its outer end is supported on said axle by a pivotable bearing, the inner end of said sleeve adjacent said cylindrical portion being resiliently centered relative to said axle by a recessed spring.

3. An improved index flange arrangement for a dual mandrel belt-record machine of the character described, said arrangement comprising a cylindrical roller, a tapered sleeve positioned at the inner end of said roller and coaxial therewith, the inner end of said sleeve adjacent said roller having a slightly larger diameter, the outer end of said sleeve having an equal diameter, the outer end of said sleeve having a raised flange against which an edge of a belt record can abut and thereby be indexed on said roller, and means mounting said sleeve relative to said roller, said means holding the outer end of said sleeve coaxial and permitting its inner end to wobble relative to said roller when a record is mounted thereon.

4. The structure in claim 3 wherein said sleeve is a hollow tapered cylinder, the outer end of said sleeve being mounted on a pivotable bearing supported from a shaft-like extension of said roller.

References Cited in the file of this patent

UNITED STATES PATENTS

| | | |
|---|---|---|
| 2,307,095 | Zaferakis | Jan. 5, 1943 |
| 2,593,158 | Lorig | Apr. 15, 1952 |
| 2,864,610 | Textrom | Dec. 16, 1958 |